(12) United States Patent
Waser et al.

(10) Patent No.: US 7,880,632 B2
(45) Date of Patent: Feb. 1, 2011

(54) MEASURING ARRANGEMENT

(75) Inventors: Max P. Waser, Hittnau (CH); Reinhard Bosshard, Hinwil (CH); Paul Engeler, Frauenfeld (CH); Ernst Pletscher, Marthalen (CH)

(73) Assignee: Kistler Holding AG, Winterthur (CH)

( * ) Notice: Subject to any disclaimer, the term of this patent is extended or adjusted under 35 U.S.C. 154(b) by 411 days.

(21) Appl. No.: 11/996,435

(22) PCT Filed: Aug. 3, 2006

(86) PCT No.: PCT/CH2006/000402

§ 371 (c)(1),
(2), (4) Date: Jan. 22, 2008

(87) PCT Pub. No.: WO2007/016799

PCT Pub. Date: Feb. 15, 2007

(65) Prior Publication Data

US 2008/0204265 A1   Aug. 28, 2008

(30) Foreign Application Priority Data

Aug. 10, 2005   (CH) .................................. 1324/05

(51) Int. Cl.
*G08B 21/00* (2006.01)
(52) U.S. Cl. ..................................... 340/680

(58) Field of Classification Search .................. 340/679, 340/521, 568.2, 506, 680; 701/29, 34
See application file for complete search history.

(56) References Cited

U.S. PATENT DOCUMENTS

| 4,972,099 A | 11/1990 | Amano et al. |
| 5,553,269 A * | 9/1996 | Nunes ......................... 703/21 |
| 5,561,426 A * | 10/1996 | Zarabadi et al. ............. 341/156 |
| 6,115,654 A * | 9/2000 | Eid et al. ...................... 701/34 |
| 6,505,086 B1 * | 1/2003 | Dodd et al. ................... 700/65 |
| 2006/0190210 A1 * | 8/2006 | Mukherjee .................. 702/130 |

OTHER PUBLICATIONS

PCT/CH2006/000402—International Search Report Publication Date: Feb. 15, 2007.

* cited by examiner

*Primary Examiner*—Phung Nguyen
(74) *Attorney, Agent, or Firm*—Dority & Manning, P.A.

(57) ABSTRACT

A measuring arrangement for assembly on or in a tool, in particular, in an injection moulding tool, comprising two or more sensors for the simultaneous measurement of measured parameters, each sensor generating a measurement signal in the operating state, at least two measurement signals being of different types from each other. The measuring arrangement comprises a signal converter with an output interface, all measured signals being converted into the same type of output signal in the signal converter. Said output signals can be transmitted through the output interface by means of a detachable signal line to an analytical unit.

15 Claims, 4 Drawing Sheets

MEASURING ARRANGEMENT

CROSS-REFERENCE TO RELATED APPLICATIONS

Figure 1:
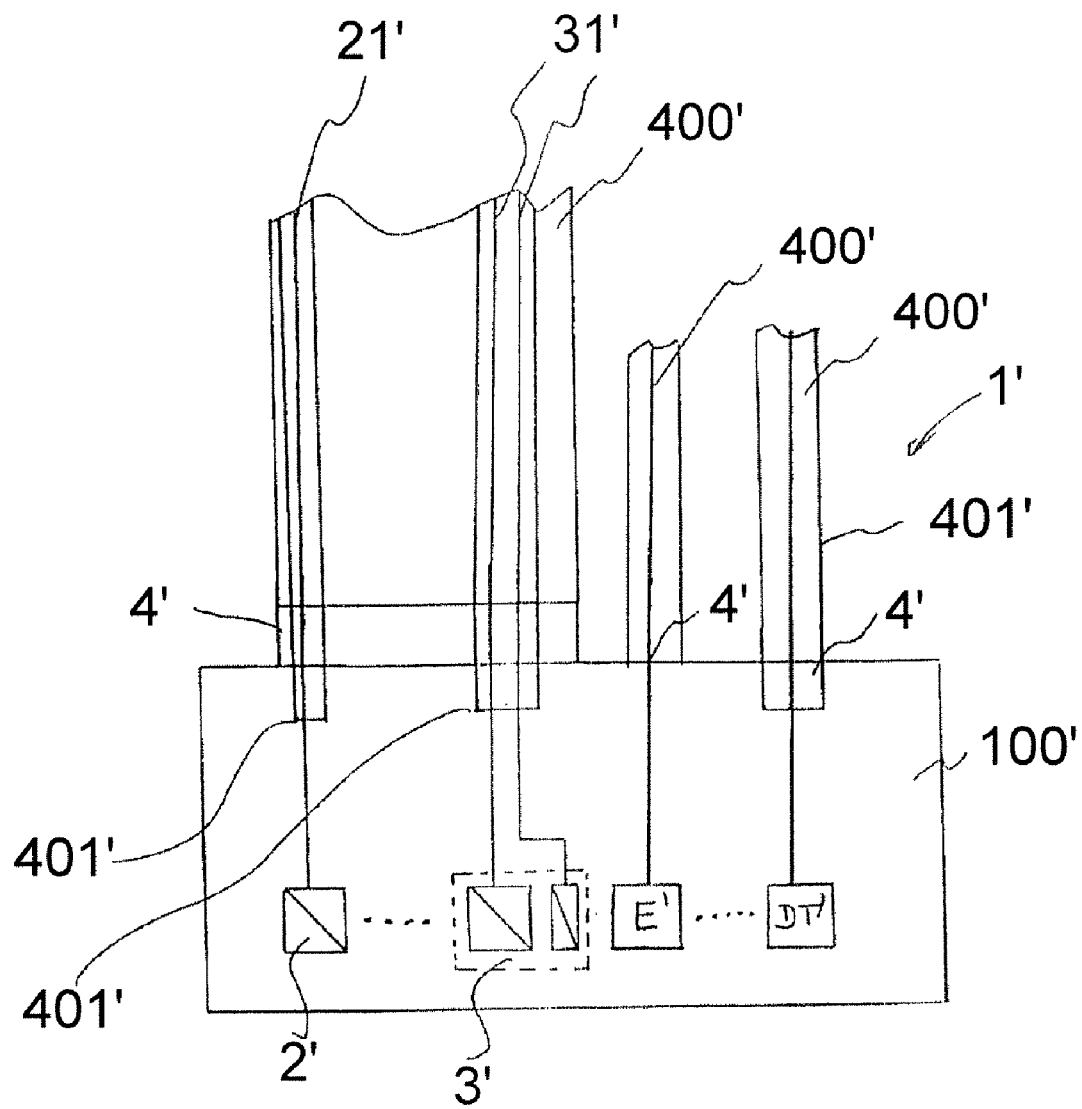

This application claims priority to Swiss Application No. 1324/05 filed Aug. 10, 2005 and International Application Serial No. PCT/CH2006/000402 filed Aug. 3, 2006.

TECHNICAL FIELD

The invention relates to a measuring arrangement, a process for signal transmission of a measurable parameter as well as a measuring station for performing said process according to the main part of the independent claim of the respective category.

PRIOR ART

In industrial measurement technique as well as in research and in other fields related to measurement technique, in particular in process analysis and process monitoring of machine tools, such as for example in injection molding, but also in other plants there are a number of demands in order to enhance the usability, to reduce sources of errors during the measurement, to improve the accuracy of the measurement, the sensitivity and the signal to noise ratio in the measurement while at the same the tool or machine or plant, respectively, used and the specific parameters thereof as well as the sensors used for the measurement must be recognized by an analysis unit for the measurement signal. Moreover, there are often further requirements which extend beyond what is said above.

For a better understanding of the advantages of the present invention first the disadvantages of a tool 100' known from the prior art will be described again by way of example with respect to FIG. 1. To define the scope of the invention against the prior art according to FIG. 1 the reference numerals in FIG. 1 are added with an apostrophe.

FIG. 1 shows in a schematic representation a portion of a measuring arrangement 1' known from the prior art including a tool 100' connected by at least three signal lines 400' to an analytical unit which is not shown here for the reason of clarity. The tool 100' being for example an injection molding tool for the production of plastic forms, comprises among others a sensor 2' which is for example a thermocouple and a combined sensor 3' which is for example a piezoelectric and/or piezoresistive and/or a different combined sensor and providing e.g. a voltage signal and a charge signal. Furthermore, an power distributor E' is provided in the tool 100' which can be supplied via a signal line 4' with electrical energy provided to the power distributor E' by a separate signal line 400' from the analytical unit and distributed by the power distributor E' to the different sensors 2', 3' and/or to the data carrier DT'. The electrical signals to be exchanged between the tool 100' and the analytical unit (not shown) are several electrical signals of different types. Thus, the thermocouple 2' supplies for example an electrical voltage, the combined piezo-sensor 3' supplies an electrical voltage and an electrical charge signal, while the data medium DT' communicates with the analytical unit via a pulsed electrical AC voltage. Finally, the power distributor E' must be supplied with a certain electrical DC power via its signal line 400'.

Since different types of electrical signals are involved there must be provided multiple signal lines 400' either with the same or with a different structure which each must be connected to the machine tool via different output interfaces.

In this respect, further measures must be taken to ensure a safe data transfer between the analytical unit and the tool 100'.

Thus, although the sensor signals 21', 31' are transmitted to the analytical unit via the same signal line 400' connected to the tool 100' at an output interface 4' insulating means 401' must be provided, in the present case a coaxial cable 401', to insulate the different sensor signals 21', 31' and the signals of the data medium DT' from each other so that no crosstalk of the signals, i.e. no electromagnetic interchange of the signals with each other, can take place which would falsify the signals. Furthermore, the number of different signal lines 400' used is reduced as much as possible for economical reasons. Thus, the signal line 400' of the data medium DT' is of a structure identical to that of the power supply line 400' of the power distributor. In this manner, in the case of a change of the tool 100' there is no risk that the signal line 400' of the data carrier DT' is involuntarily connected to the power distributor E' and that the electrical power supply for the tool 100' is connected to the data medium DT' which on the one hand leads to the destruction of the data medium DT' and on the other hand can damage the analytical unit.

Thus, for a reliable measurement or a correct analysis, respectively, of the measurement signals additional signals must be exchanged between a plant equipped with sensors, such as a machine tool, and the analytical unit. For example, information on parametrization and/or reference curves must be exchanged between the machine tool and the analytical unit, optionally auxiliary channels must be provided, e.g. to provide the sensors themselves or other components with electrical energy, in some cases data regarding the status of the machine tool and/or the analytical unit, i.e. for example whether the machine tool and/or the analytical unit are in operation at all, whether a functional signal connection exists between them, and many other information more must be transmitted. Those skilled in the art are well familiar with these problems.

Another important point is the quality management or product management, respectively, as well as operational safety. The analytical unit must not only be provided with information purely regarding the operational state of the machine tool and the recorded measurement data as such but in certain cases also with data concerning the production cycle within the machine tool and the manufactured products themselves, such as e.g. serial numbers, by which the individual product manufactured can always be identified for the purposes of quality control and quality management.

In this respect, the connection between the machine tool or a different plant and the analytical unit must also comply with high demands concerning simple and safe operation. This means that it must be ensured that for example also less qualified operation personnel will be able to safely and quickly disconnect and/or connect the link between machine tool and analytical unit, for example in the case of a tool exchange, in which case it must be excluded that cable connections, measurement channels etc. for example can be confused resulting in false recording of measurement data or false interpretation thereof by the analytical unit, for example. In particular, it is necessary to prevent confusion of signal lines between the machine tool and the analytical unit. Thus, in the worst case confusion of a measurement line with a line for supplying electrical energy can result in the destruction of the sensor units of the machine tool and/or a damage in the analytical unit which can lead to production shutdown and therefore can be associated with massive economical damage.

In this respect, a problem which has not been solved so far is that for example a machine tool, such as a machine tool for manufacturing plastic components, must exchange several signals of different types with an analytical unit. Thus, a piezoelectric sensor for example can provide a signal in the form of a displacement of electrical charges while a thermocouple provides a voltage signal which additionally depends on the material of the input line between thermocouple and analytical unit, and a third sensor could be a resistance sensor, for example, such as a PT-1000 temperature sensor or a piezoresistive sensor in a bridge circuit which requires an exchange of electrical current and voltage signals.

To solve the problems described above by way of example and not in complete detail with respect to signal transmission between the machine tool and the analytical unit the most different solutions are known from the prior art each of which tries to solve one or another partial problem with respect to certain aspects but which throughout do not overcome the problem as a whole in a satisfactory way.

Thus, it is known for example to transmit signals of different types via a plug connection between machine tool and a transmission line wherein the transmission line in this case is constituted of individual partial lines for each of the sensor signals. However, these lines must often be electrically insulated individually from each other with high efforts since otherwise between two signal lines of different types, e.g. between a signal line transmitting a charge signal and another signal line transmitting an electrical current and/or voltage signal, in particular an electrical AC voltage signal, there is the risk of a so-called "crosstalk" of the signals from one signal line to the other which may result in falsification of the signals with the well-known consequences.

It should be understood that these solutions one the one hand are very expensive because the respective cable connections for signal transmission have a complex structure and these systems are particularly inflexible regarding their suitability for daily use. Namely, due to the complex structure of the connecting cables the customer is unable to assemble them simply by him- or herself. If e.g. a connecting cable for connecting a machine tool to the associated analytical unit is delivered it is extremely difficult for the customer to adapt the length of the cable to the situation on-site, for example.

Another problem which often is not completely independent from the other problems mentioned is that one and the same sensor requires more than one so-called measurement channel for signal transmission whereby the cable connection between e.g. the machine tool for the production of injection molded parts made of plastic and the associated analytical unit becomes even more complicated. Thus, e.g. a Wheatstone bridge consisting of electrical resistances and/or piezoresistive elements and/or resistance thermometers can include in addition to a measurement line or a "ground" line, respectively, three other signal ports which must be transmitted separately via a connecting line between machine tool and analytical unit. The same often applies also to combined sensors or other sensors or probes which are all well-known to those skilled in the art and therefore need not be separately mentioned and explained here.

As already mentioned, in this respect the most different solutions have been disclosed in the prior art in order to solve this problem all of which only relate to partial aspects of a comprehensive solution and which even in combination do not provide a useful alternative. For example, the so-called "SAW technique" (surface acoustic wave) for sensor recognition is known to those skilled in the art which is very expensive and particularly does not provide a solution for the problems regarding the transmission of signals of different types as mentioned above. The same applies to the "TEDS technique" (technical electronic data sheet) in which a data medium is built into the sensor and two additional electrical lines are required. Besides, the TEDS technique is limited to sensor temperatures of about 120° C. for reasons known to those skilled in the art.

A particular disadvantage is that the TEDS technique prevents the use of the "single wire technique" which requires only one input cable per measurement signal. Another problem of the TEDS technique is that it cannot be used in small sensors due to the required relatively large size of the structure.

Although one can continue to use the existing single wire cable systems if the SAW technique is employed this technique is also extremely complex and expensive since complicated circuits are required for analysis of the sensor identification data, for example, and the data media at the sensor can only be loaded once which carry only one sensor identification number (a so-called "dumb number") and are unable to store sensor characteristics.

Also not solved are the problems concerning the risk of confusion of the connecting cables which arise if different measurement signals or measurement signals of different types, respectively, are to be transmitted by means of connecting systems of a similar appearance, i.e. with similar connecting plugs and signal lines.

BRIEF SUMMARY AND OBJECTS OF THE INVENTION

Therefore, it is an object of the invention to overcome the disadvantages known from the prior art by providing a novel measuring arrangement. In this respect, it is especially an object of the invention to suggest a measuring arrangement which has a superior flexibility as compared to the prior art, which is constructed in an especially simply way, enables the transmission of signals of different types without problems while at the same time the safety and simplicity of handling is optimized.

The subject matters of the invention which achieve these objects are characterized by the features of the independent claims of the respective category.

The dependent claims relate to particularly advantageous embodiments of the invention.

Therefore, the invention relates to a measuring arrangement for assembly on a tool comprising a first sensor for measuring a first measurable parameter and a second sensor for measuring a second measurable parameter wherein in the operating state the first sensor generates a first measurement signal and the second sensor generates a second measurement signal and wherein the first measurement signal is or can be of a type different from the second measurement signal. In this respect, the measuring arrangement comprises a signal converter connected to an output interface so that the first measurement signal and/or the second measurement signal can be converted into the same type of output signal and the output signal can be transmitted to an analytical unit via the output interface which is connected via a signal line to the analytical unit.

It is an essential feature of the invention that a signal converter connected to an output interface is provided so that two measurement signals of different types can be converted in two output signals of the same type.

If for example a machine tool comprises a piezoelectric sensor for measuring a pressure and a thermocouple for measuring a temperature up to now it has been necessary two provide two completely different transmission units between the machine tool and the analytical unit to transmit the measured parameters provided by the sensors mentioned above in the operational state. For a correct analysis of the thermoelectric voltage supplied by the thermocouple the thermocouple must be contacted with an electrical line consisting of an alloy with a specific composition (balance lead) since otherwise contact voltages might arise resulting in the measurement of an erroneous temperature. The measured signal of the piezosensor which essentially carries an electrical charge signal is particularly sensitive to disturbances such as electrical crosstalk from a different signal line which carries a third signal, e.g. an electrical AC voltage or an electrical AC current.

Up to now very specific and often very complex measures had to be taken for transmission of the signals to transmit the signals reliably from the machine tool into the analytical unit and vice versa. Particularly, care had to be taken not to confuse the connecting cables between machine tool and analytical unit since otherwise a reliable and correct signal transmission between machine tool and analytical unit could no longer be ensured.

Particularly, in the case of an exchange of one tool against another tool in the measuring arrangements known from the prior art also the complete input line had to be exchanged if the two tools exchanged for each other were not completely identical. If for example two different thermocouples for temperature measurement were provided in the two tool usually the whole cabling had to be exchanged for the reasons mentioned above and well-known to those skilled in the art.

The present invention avoids all those disadvantages because due to a signal converter incorporated in the measuring arrangement itself the first measured signal and/or the second measured signal can be converted into two output signals of the same type prior to being sent via the output interface connected to the analytical unit e.g. in the form of an electrical and/or acoustic and/or optical signal by the signal line to the analytical unit.

As will be detailed further below, it should be understood that not only the signals generated by the sensors can be converted into signals of the same type by means of the signal converter but also other signals such as for example tool information, process information etc. can be converted by the signal converter into the same type of signal.

Thus, in a measuring arrangement according to the invention preferably only signals of the same type are exchanged between the output interface of the tool and the analytical unit so that e.g. in the case of a tool change the cabling between the tool and the analytical unit does no longer have to be changed since always the same type of signal is transmitted between each tool and the analytical unit.

A measuring arrangement according to the invention can for example be arranged in such a way that the signal converter converts all signals to be exchanged between the tool and the analytical unit into a current signal. That means that the machine tool includes for example a piezoelectric sensor and/or a piezoresistive sensor for pressure measurement, for technical reasons a thermocouple and a PT1000 are necessary for temperature measurement and furthermore operational data and data on the tool itself from a data memory present in the machine tool must be exchanged between analytical unit and tool.

The signals of different types providing the components described above, i.e. the charge signal of the piezoelectric sensor, the voltage or current signal, respectively, of the piezoresistive sensor and the PT1000 as well as the digital signals from the data memory are converted in the signal converter e.g. into a current signal which can then be transmitted via the signal line between the output interface and the analytical unit.

If the tool has to be exchanged in a specific production step this can be carried out using the same cabling because the new tool also includes a signal converter which again converts the signals to be transmitted for example into a current signal of the same type as that provided by the first tool.

In this regard it should be understood that naturally also further connections to the tool can be provided which supply the tool for example with electrical energy which the analytical unit cannot provide or can include other auxiliary or supply connections. It is essential for the invention that the data transmission between the analytical unit and the tool is performed via signals of the same type provided by the signal converter.

In a specific embodiment of a measuring arrangement of the invention the first sensor and/or the second sensor is a pressure sensor, in particular a piezoelectric or a piezoresistive pressure sensor and/or a temperature sensor, in particular a thermocouple and/or a piezoresistive temperature sensor and/or a resistance thermometer and/or a combined sensor.

Therefore, the first measured signal and/or the second measured signal can be an electrical charge, an electrical voltage, an electrical current, a thermoelectric voltage and/or another electrical measurement signal.

In this respect, the two or further output signals of the same type can also be an optical output signal or an acoustic output signal or an electrical output signal, especially an electrical voltage or an electrical current depending on the signal converter being an optical, acoustic or an electrical signal converter.

In an example particularly important for practice of a measuring arrangement according to the invention a data medium connected to the output interface is provided with system information wherein the system information is sensor information and/or information on the signal converter and/or tool information and/or product information and/or process information and/or a look-up table and/or a reference or calibration curve.

Preferably, a signal carrying information on the system can be converted by the signal converter into the output signal of the same type.

In another example a multiplexing device, particularly a time multiplexer and/or a frequency multiplexer, is provided for transmitting the output signal. In this manner the two or more output signals of the same type provided by the signal converter can be transmitted essentially via only a single signal line between the measuring arrangement and the analytical unit.

In another example the output interface can be an Ethernet interface so that data transfer between the analytical unit and the machine tool can be performed via an internal computer network or even via the Internet. In this way, separate cabling between the analytical unit and the machine tool can be completely omitted and confusing of the cable connectors between machine tool and analytical unit is completely eliminated.

Furthermore, the invention relates to a process for signal transmission of a measurable parameter of a sensor of a measuring arrangement said measuring arrangement comprising a first sensor by which a first measurable parameter is measured and a second sensor by which a second measurable parameter is measured. The first sensor generates a first measurement signal and the second sensor generates a second measurement signal wherein the first measurement signal is of a type different from the second measurement signal. The measuring arrangement for performing the process according to the invention comprises a signal converter connected to an output interface wherein the signal converter converts the first and/or second measurement signal in two output signals of the same type as far as measurement technique is concerned and wherein the output signal is supplied to the analytical unit via the output interface being connected to the analytical unit by a signal line.

The sensors are exchangeable. At a later time, a temperature sensor can be connected instead of a pressure sensor, for example. In particular, active sensors are used or these applications which do not require feeding.

It is characteristic for the inventive measuring arrangement that the measurable parameters can be measured simultaneously. Correspondingly, the output signals can also be transmitted simultaneously and in real time.

By arranging the measuring arrangement which includes the signal converter in or on the tool it is possible to use single wire technique since the tool has an insulating effect. For this reason expensive insulated lines can be omitted making the measuring arrangement much cheaper.

Particularly, the measuring arrangement can include eight or more measuring channels for connecting the same number of exchangeable sensors.

In a specific example of a process of the invention the first measurement signal and/or the second measurement signal is converted into an optical output signal and/or an acoustic output signal and/or in an electrical output signal, particularly in an electrical voltage or an electrical current.

In another example the output is processed in a multiplexing device prior to transmission via the output interface to the analytical unit, especially time multiplexing and/or frequency multiplexing of the output signal is performed.

According to the invention, the output signals can also be converted into a network format by means of an electrical circuit and transmitted via a network connection to the analytical unit wherein the network connection can be an Ethernet, a RS 232, an IEEE, a CAN bus or a CAN operator.

Furthermore, the invention relates to a measuring station for performing a process according to the invention wherein the measuring station comprises a tool including a measuring arrangement as described above. Specifically, the tool is a internal combustion engine, a refrigerating machine, a scientific tool, specifically a scientific experimental set-up, or a different tool, in particular an injection molding tool. It should be understood that the tool can be also any other tool in which signals of different types are generated which must be exchanged with an analytical unit.

It should be further understood that the invention is not limited to the specific examples explained in detail above. Rather, these shall only be understood as exemplary for the description of the invention. Particularly, besides other variations not described in detail herein all suitable combinations of the examples mentioned above are comprised by the invention.

Figure 2:
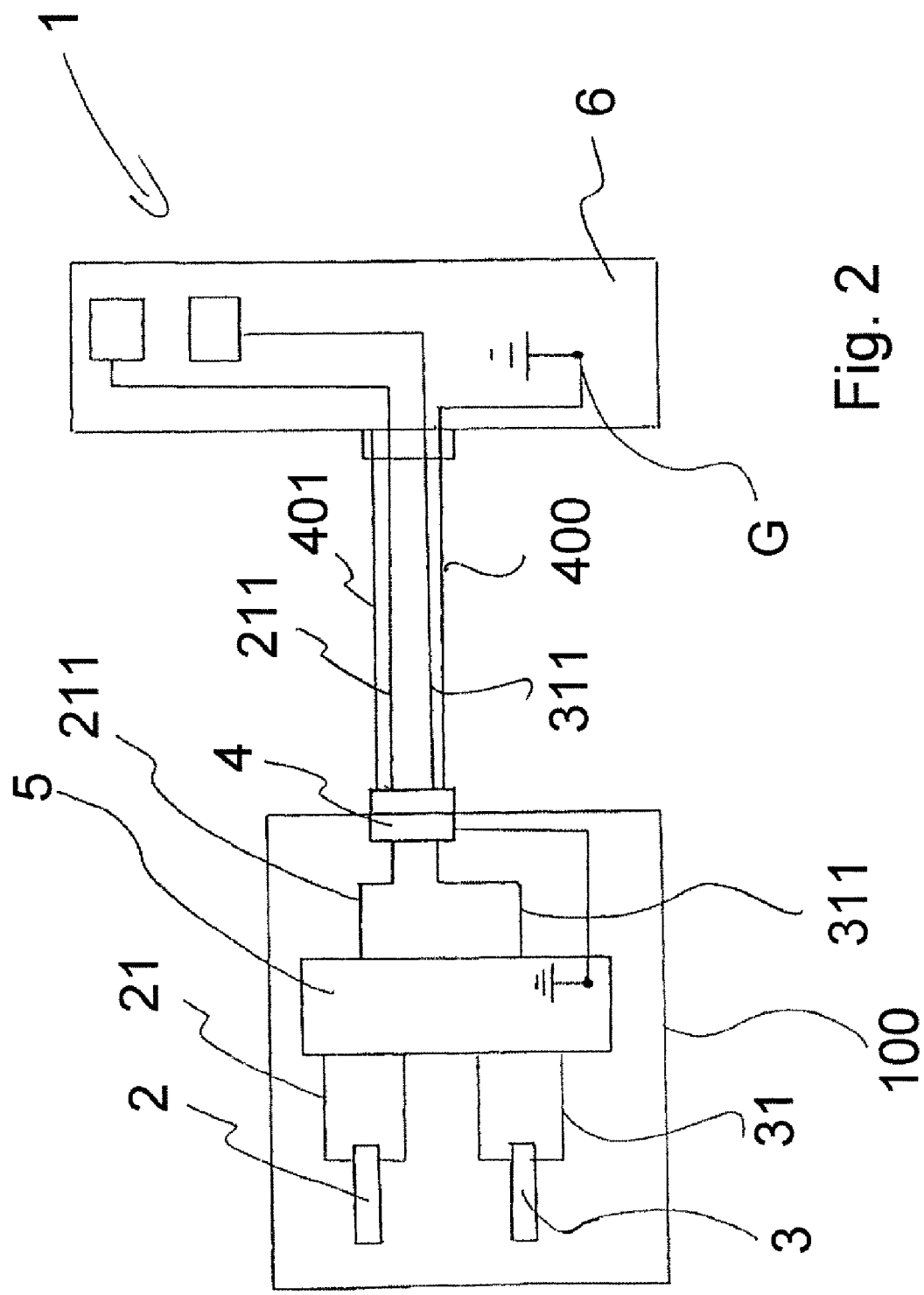
Figure 3:
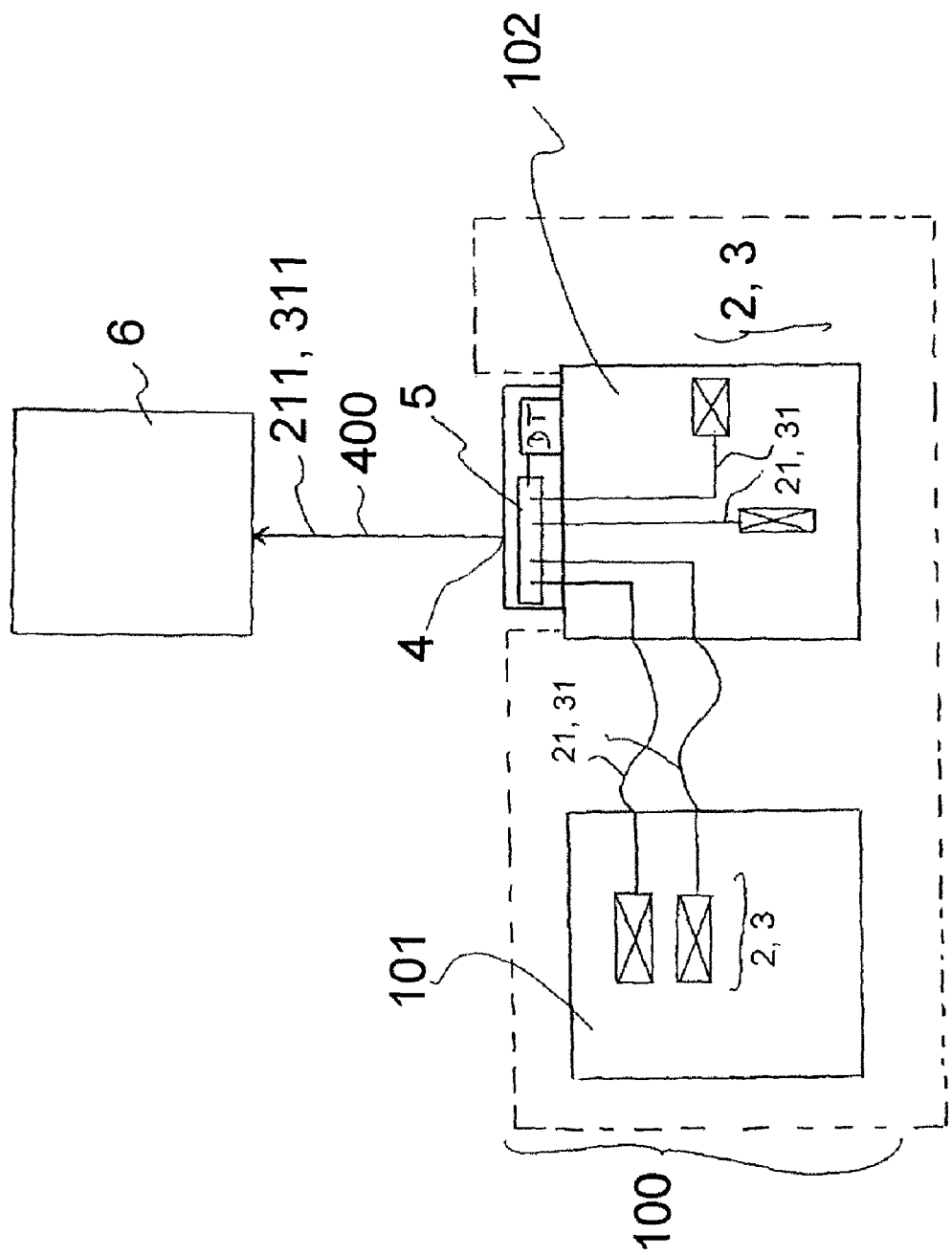
Figure 4:
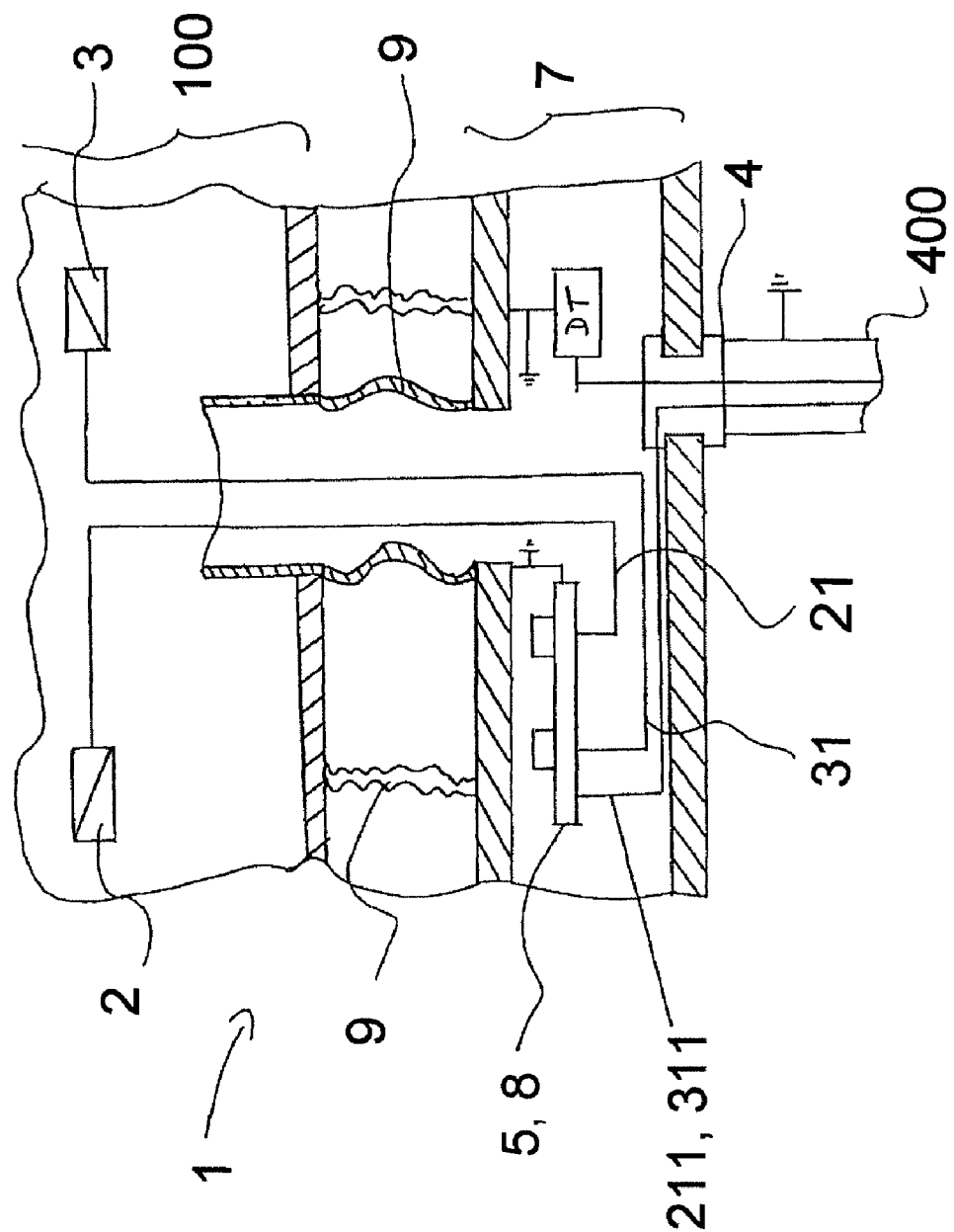

In the following the invention will be described in more detail with regard to the drawing. The Figures schematically show:

FIG. 1 a tool known from the prior art;

FIG. 2 a schematic representation of a first example of a measuring arrangement according to the invention;

FIG. 3 a bipartite tool in a measuring arrangement according to the invention;

FIG. 4 a measuring arrangement in a thermally decoupled housing.

The reference numerals in FIGS. 2 to 4 which relate to the present invention are not written with an apostrophe.

DETAILED DESCRIPTION OF EMBODIMENTS OF THE INVENTION

The problems from the prior art as described above only by way of example are prevented by the present invention.

FIG. 2 shows in a schematic representation a first example of a measuring arrangement according to the invention which as a whole is referred to by the reference numeral 1 in the following.

The measuring arrangement of FIG. 2 comprises a tool 100, specifically a machine tool 100 in the form of an injection molding tool 100 for plastic parts, e.g. for plastic parts in the medical field such as syringes, packaging materials or other products. The machine tool 100 is connected via a single signal line 400 to an analytical unit 63 which can for example comprise a data processing unit besides other devices. For insulation from external electromagnetic influences the signal line 400 comprises an insulating means 401 which preferably defines the analytical device and the machine tool on a common electrical ground potential G.

In the example shown in FIG. 2, the machine tool 100 comprises a first sensor 2 which is a thermocouple and a second sensor 3 which is a piezoresistive pressure sensor. The thermocouple 2 provides a thermoelectric voltage 21 while the piezoresistive pressure sensor 3 provides an electrical voltage and/or current signal 31. Thus, the two sensors 2, 3 supply at least two different types of electrical measurement signals 21, 31. According to the invention, the machine tool 100 includes a signal converter 5 which converts the two different types of measurement signals 21, 31 in two output signals 211, 311 of the same type, for example in two memorized currents 211, 311 each at a maximum of 40 mA, each of which can be supplied as a pulsed or non-pulsed direct current signal 211, 311 via the output interface 4 in this case being a simple two-pole plug 4, through the insulated signal line 400 to an analytical unit 6. Due to the conversion of the measurement signals 21, 31 by means of the signal converter 5 into the memorized currents 211, 311 no particular demands need to be made on the signal line 400 with respect to the material from which the cables of the signal line 400 are fabricated or the length thereof or other specific characteristics. Practically any electric line can be used as the signal line 400 with the only requirement that it has suitable terminals for the connection to the output interface 4.

Since the signal line 400 is connected via a single port, for example a single plug, to the output interface 4 confusion of the two output signals 211 and 311 is completely excluded. Since the measurement signals 21 and 31 were converted into the robust output signals 211, 311 in the form of simple current signals 211, 311 by means of the signal converter 5 no particular demands are made on the signal line 400. That means that very cheap signal lines 400 can be used which can be configured by the user him- or herself in any way, for example can be adapted to the situation on-site with respect to their length.

FIG. 3 shows a schematic representation of a bipartite tool 100 in a measuring arrangement 1 according to the invention as a second example.

The tool 100 of FIG. 3 is a bipartite injection molding tool 100 which is well-known to those skilled in the art from various variations for the production of injection molded parts. The injection molding tool 100 is connected to the analytical unit 6 via the output interface 4 which may be for example a multipolar plug connector 4, and the signal line 400 which is represented in FIG. 3 simply as an arrow. The injection molding tool 100 is a bipartite tool 100 having a first tool half 101 and a second tool half 102 which are movable with respect to each other in certain operational states of the injection molding tool 100. Both the first tool half 101 and the second tool half 102 each contain sensors 2, 3 able to supply signals of the same type or of a different type, i.e. not of the same type. Furthermore, a data medium DT is provided which can include for example information concerning the process cycle, e.g. a look-up table, reference curves or other kinds of data, information on the type and function of the tool 100, data or information on the production process and/or product information and much more.

According to the invention, a signal converter 5 is provided for example in the second tool half 102 of the injection molding tool which can be supplied both with the measurement signals 21, 31 of a different type from the first tool half 101 and with the measurement signals 21, 31 together with the signal of the data medium DT so that all these signals can be converted into output signals of the same type 211, 311 by means of the signal converter 5 and can be supplied to the analytical unit 6 via a single signal line 400. That means that even in the case of a multipartite tool 100 containing for example a first tool half 101 and a second tool half 102 only a single signal line 400 is required according to the invention for connection of the tool 100 to the analytical unit 6 whereby the different original measurement signals 21, 31 of different types of the sensors 2, 3 can be transmitted in the form of signals of the same type.

Finally, FIG. 4 shows in a schematic representation a measuring arrangement having a thermally and/or elastically decoupled housing 7 as another example. This specific embodiment of a measuring arrangement 1 of the invention can be used in a particularly advantageous manner if the tool 100 is one in which high temperatures are generated during operation which can have a harmful effect on the signal converter 5 and/or the data medium DT and/or other components provided for the conversion or transmission of measured parameters.

In this case, a separate housing 7 is provided which includes for example the data medium DT and the signal converter 5. Of course, also the sensors 2, 3 can be incorporated in the housing 7. In the example in FIG. 4 there is provided additionally a multiplexing device 8 which can be a frequency multiplexer 8 or a time multiplexer 8 as well-known to the skilled artisan so that the output signals 211, 311 converted from the measured signals 21, 31 by the signal converter 5 can be supplied in a time- or frequency-processed manner via the output interface 4 and the signal line 400 through a single line connection to an analytical unit not represented in FIG. 4.

It should be understood that the signal converter 5 can convert the measured signals 21, 31 not only into electrical output signals 211, 311 but for example also in optical, acoustic or other output signals 211, 311 and that the multiplexing device can also be an acoustic, optical or other multiplexing device.

As already mentioned above, the example represented in FIG. 4 of a measuring arrangement 1 according to the invention is especially suitable if high temperatures and/or high mechanical strains, for example very strong vibrations, predominate in the tool itself 100 comprising all or some of the sensors 2, 3. To prevent damage of the signal converter 5 and/or the data medium DT and/or the multiplexing device 8 and/or other, particularly electronic but also mechanic components such as for example the output interface 4 the above-mentioned components to be protected are incorporated in a separate housing 7 which is decoupled from the tool 100 by thermal and/or mechanical decoupling means 9.

In this respect, the thermal decoupling means 9 can be formed in different ways. They can be for example elements with good or poor thermal conductivity such as rigid or flexible passages 9 or spring elements 9 made of metal or plastic. Heat-conductive or resilient layers or composite materials can be provided between the housing 7 and another surface of the tool 100 or any other suitable means which ensure sufficient mechanical and/or thermal decoupling.

| List of reference numerals | |
|---|---|
| Prior art | |
| 1' | measuring arrangement |
| 100' | tool, injection molding tool |
| 2' | first sensor |
| 21' | first measurement signal |
| 3' | second sensor |
| 31' | second measurement signal |
| 4' | output interface |
| 400' | signal line |
| 401' | insulation means |
| DT' | data medium |
| E' | power distributor |
| Invention | |
| 1 | measuring arrangement |
| 100 | tool |
| 101 | first tool half |
| 102 | second tool half |
| 2 | first sensor |
| 21 | first measurement signal |
| 211 | output signal |
| 3 | second sensor |
| 31 | second measurement signal |
| 311 | output signal |
| 4 | output interface |
| 400 | signal line |
| 401 | insulation means |
| 5 | signal converter |
| 6 | analytical unit |
| 7 | housing |
| 8 | multiplexing device |
| 9 | decoupling means |
| DT | data medium |
| G | ground potential |

The invention claimed is:

1. A measuring arrangement assembled on or in an injection molding tool comprising two or more exchangeable sensors for the simultaneous measurement of measured parameters wherein in the operating state each sensor generates a measurement signal wherein at least two measurement signals are of types different from each other and the measuring arrangement comprises:
a signal converter and a detachable signal line detachably connected to the signal converter, the signal converter having an output interface wherein in the signal converter all measured signals can be converted into the same type of output signal and that these output signals can be transmitted via the output interface via the detachable signal line to an analytical unit.

2. The measuring arrangement according to claim 1, wherein the sensors are connected to the signal converter by non-insulated lines.

3. The measuring arrangement according to claim 1, wherein the output signals can be transmitted simultaneously and in real time.

4. The measuring arrangement according to claim 1, wherein one of the sensors is one of: a pressure sensor, a piezoelectric pressure sensor, a piezoresistive pressure sensor, a temperature sensor, a thermocouple, a piezoresistive temperature sensor, a resistance thermometer, and a combined sensor.

5. The measuring arrangement according to claim 1 wherein at least one of the measured signals is one of: an electrical charge, an electrical voltage, an electrical current, a thermoelectric voltage, and another electrical measurement signal.

6. The measuring arrangement according to claim 1 wherein the two output signals of the same type are one of: optical output signals, acoustic output signals, and electrical output signals, in particular one of an electrical voltage and an electrical current.

7. The measuring arrangement according to claim 1, further comprising a data medium connected to the output interface having system information wherein the system information includes one of: sensor information, information of the signal converter, tool information, process information, and product information.

8. The measuring arrangement according to claim 1, wherein the measuring system is adapted to the connection of at least eight sensors.

9. The measuring arrangement according to claim 1, further comprising a multiplexing device, particularly a time multiplexer and/or a frequency multiplexer, for transmission of the output signals.

10. A process for signal transmission of a measured parameter of a sensor of a measuring arrangement assembled on or in a tool, particularly in an injection molding tool, comprising two or more exchangeable sensors by which measurable parameters are measured simultaneously wherein each sensor generates a measurement signal wherein at least two measurement signals are of types different from each other, the process comprises using a signal converter having an output interface wherein the signal converter converts all measured signals into the same type of output signal and that these output signals are transmitted via the output interface by means of a detachable signal line to an analytical unit.

11. The process according to claim 10, wherein the output signals can be transmitted simultaneously and in real time.

12. The A process according to claim 10 wherein at least one of the measured signals is converted into one of: optical output signals, acoustic output signals, and electrical output signals, in particular into at least one of an electrical voltage and an electrical current.

13. The A process according to claim 10 wherein the output signals are processed in a multiplexing device prior to transmission via the output interface to the analytical unit, particularly time multiplexing and/or frequency multiplexing of the output signals is performed.

14. The process according to claim 10 wherein the output signals are converted by means of an electronic circuit into a network format and are transmitted via a network connection to the analytical unit wherein the network connection can be one of: an Ethernet, a RS 232, an IEEE, a CAN bus and a CAN operator.

15. A measuring station for performing a process for signal transmission of a measured parameter of a sensor of a measuring arrangement assembled with a tool having at least two exchangeable sensors by which measurable parameters are measured simultaneously wherein each sensor generates a measurement signal wherein at least two measurement signals are of types different from each and the measuring arrangement includes a signal converter and a detachable signal line detachably connected to the signal converter, the signal converter having an output interface wherein the signal converter converts all measured signals into the same type of output signal and that these output signals are transmitted via the output interface via the detachable signal line to an analytical unit, wherein the tool is one of: an internal combustion engine, a refrigeration machine, a scientific tool, a scientific experimental set-up, and an injection molding tool.

* * * * *